US012677281B2

(12) United States Patent
Zhang et al.

(10) Patent No.: US 12,677,281 B2
(45) Date of Patent: Jul. 7, 2026

(54) METHOD AND APPARATUS FOR OVERHEAD REDUCTION FOR CONFIGURED GRANT BASED UPLINK TRANSMISSION

(71) Applicant: Lenovo (Beijing) Limited, Beijing (CN)

(72) Inventors: Yu Zhang, Haidan District (CN); Haipeng Lei, Haidian District (CN); Alexander Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 416 days.

(21) Appl. No.: 17/630,002

(22) PCT Filed: Aug. 2, 2019

(86) PCT No.: PCT/CN2019/099055
§ 371 (c)(1),
(2) Date: Jan. 25, 2022

(87) PCT Pub. No.: WO2021/022409
PCT Pub. Date: Feb. 11, 2021

(65) Prior Publication Data
US 2022/0256578 A1     Aug. 11, 2022

(51) Int. Cl.
*H04W 72/21*      (2023.01)
*H04L 1/1812*     (2023.01)
(Continued)

(52) U.S. Cl.
CPC ........... *H04W 72/21* (2023.01); *H04L 1/1812* (2013.01); *H04W 72/23* (2023.01)

(58) Field of Classification Search
CPC ......... H04W 72/0413; H04W 72/0406; H04W 72/042; H04W 72/0446; H04W 72/085;
(Continued)

(56) References Cited

U.S. PATENT DOCUMENTS 11,490,417 B2 * 11/2022 Talarico ............ H04W 72/1273
2019/0342911 A1 * 11/2019 Talarico ................ H04L 5/0098
(Continued)

FOREIGN PATENT DOCUMENTS

CN          109714827          5/2019
CN          109905215 A        6/2019
(Continued)

OTHER PUBLICATIONS

3GPP TSG RAN WG1 Meeting #97, R1-1906678, May 13-17, (Year: 2019).*
(Continued)

*Primary Examiner* — Moo Jeong
*Assistant Examiner* — Scott A Schlack
(74) *Attorney, Agent, or Firm* — FIG. 1 Patents

(57) ABSTRACT

Embodiments of the present disclosure relate to method and apparatus for HARQ feedback. According to an embodiment of the present disclosure, a method can include: receiving control information at least for a plurality of physical uplink shared channel (PUSCH) transmissions in an uplink transmission burst; and transmitting the plurality of PUSCH transmissions in the uplink transmission burst based on the control information, wherein one of the plurality of PUSCH transmissions includes an uplink control information (UCI) signaling at least associated with all PUSCH transmissions in an initial slot of the uplink transmission burst. Embodiments of the present disclosure can reduce the overhead for configured grant based uplink transmission.

20 Claims, 9 Drawing Sheets

(51) Int. Cl.
　　*H04L 1/1822*　　　(2023.01)
　　*H04W 72/23*　　　(2023.01)
　　*H04W 74/0808*　　(2024.01)

(58) Field of Classification Search
　　CPC ......... H04W 72/1231; H04W 72/1268; H04W
　　　　　　　72/1284; H04W 72/1289; H04W 72/14;
　　　　　　　H04W 74/002; H04W 74/006; H04W
　　　　　　　74/0808; H04W 74/0816; H04W 16/14;
　　　　　　　H04L 1/0004; H04L 1/0013; H04L
　　　　　　　1/0026; H04L 1/1812; H04L 1/1819;
　　　　　　　H04L 1/1854; H04L 5/0048; H04L
　　　　　　　　　　　　　　　　　　　　5/0055
　　See application file for complete search history.

(56)　　　　　References Cited

U.S. PATENT DOCUMENTS

| | | | | |
|---|---|---|---|---|
| 2020/0322982 | A1* | 10/2020 | Wu | H04W 48/16 |
| 2021/0176776 | A1* | 6/2021 | Choi | H04L 1/1819 |
| 2021/0218538 | A1* | 7/2021 | Myung | H04L 27/0006 |
| 2021/0219329 | A1* | 7/2021 | Zhou | H04L 1/1819 |
| 2021/0345385 | A1* | 11/2021 | Karaki | H04L 5/0053 |
| 2022/0116152 | A1* | 4/2022 | Iyer | H04L 1/1819 |
| 2022/0174722 | A1* | 6/2022 | Talarico | H04W 72/23 |
| 2022/0174735 | A1* | 6/2022 | Li | H04W 74/0808 |

FOREIGN PATENT DOCUMENTS

| | | |
|---|---|---|
| WO | 2018174760 A1 | 9/2018 |
| WO | 2021022409 A1 | 2/2021 |

OTHER PUBLICATIONS

"International Preliminary Report on Patentability", PCT Application No. PCT/CN2019/099055, Feb. 17, 2022, 6 pages.
"International Search Report and Written Opinion", PCT Application No. PCT/CN2019/099055, Apr. 26, 2020, 7 pages.
Intel Corporation , "Enhancements to configured grants for NR-unlicensed", 3GPP TSG RAN WG1 Meeting #97, R1-1906788, Reno, Nevada, USA [retrieved Apr. 13, 2022]. Retrieved from the Internet <https://www.3gpp.org/ftp/TSG_RAN/WG1_RL1/TSGR1_97/Docs/>., May 17, 2019, 11 pages.
LG Electronics , "Discussion on configured grant for NR-U", 3GPP TSG RAN WG1 Meeting #97, R1-1906678, Reno, Nevada, USA [retrieved from the Internet <https://www.3gpp.org/ftp/TSG_RAN/WG1_RL1/TSGR1_97/Docs/>., May 17, 2019, 8 pages.

* cited by examiner

METHOD AND APPARATUS FOR OVERHEAD REDUCTION FOR CONFIGURED GRANT BASED UPLINK TRANSMISSION

TECHNICAL FIELD

Embodiments of the present disclosure generally relate to wireless communication technology, especially to a method and an apparatus for overhead reduction for configured grant (CG) based uplink transmission.

BACKGROUND

In 3GPP 5G new radio (NR), an unlicensed spectrum at 5.7 GHz has a bandwidth up to hundreds of MHz, which is supported in NR access on unlicensed spectrum (NR-U).

Listen Before Talk (LBT) or sometimes listen before transmit (LBT) or clear channel assessment (CCA) is a channel access technique used for transmission on an unlicensed spectrum. In order to achieve fair coexistence with other wireless systems, the LBT is required to be performed before a transmitter can start transmitting on an unlicensed spectrum. The LBT is executed by performing energy detection on a certain channel. If power level detected on the channel is below a predefined threshold the channel is deemed to be empty and is available for transmission. Only when the channel is deemed to be idle by the LBT process, can the transmitter start the transmission on the channel and occupy the channel up to the maximum channel occupancy time (MCOT). Otherwise, if the detected power level on the channel exceeds a predefined threshold, the channel is considered to occupied or not idle. In this situation, the transmitter cannot start the transmission and the mobile unit will continue performing the LBT process until the channel is determined to be unoccupied or idle by the LBT process.

Due to uncertainty of the unlicensed channel availability, a NR-U user equipment (UE) may not access the resources indicated by a configured grant (CG) as a result of LBT process indicated an occupied channel, which leads to underutilized resources and excessive latencies. This happens because the pre-configured transmission opportunity on the uplink (UL) data channel is missed and the UE needs to defer its transmission until the following transmission opportunity, which may be after at least one slot in the best case or may be in next period in the worst case.

A feasible solution to solve the above problem is by using multiple starting positions in time domain for a CG based UL transmission. However, doing so may cause significant uplink signaling overhead. Therefore, the industry desires an improved technology to reduce the overhead for CG based uplink transmission.

SUMMARY OF THE APPLICATION

One objective of embodiments of the present disclosure is to provide a technical solution for overhead reduction for configured grant based uplink transmission.

According to an embodiment of the present disclosure, a method may include: receiving control information at least for a plurality of physical uplink shared channel (PUSCH) transmissions in an uplink transmission burst; and transmitting the plurality of PUSCH transmissions in the uplink transmission burst based on the control information, wherein one of the plurality of PUSCH transmissions includes an uplink control information (UCI) signaling at least associated with all PUSCH transmissions in an initial slot of the uplink transmission burst.

In an embodiment of the present disclosure, the UCI signaling may include a hybrid automatic repeat request (HARQ) process identity (ID) field.

In another embodiment of the present disclosure, the UCI signaling may include at least one of the following fields: new data indicators (NDI) field; redundancy version (RV) field; user equipment (UE) ID field; starting and ending position field; transmission parameter field; and code block group transmission information (CBGTI) field.

According to another embodiment of the present disclosure, a method may include: transmitting control information at least for a plurality of PUSCH transmissions in an uplink transmission burst; and receiving the plurality of PUSCH transmissions in the uplink transmission burst based on the control information, wherein one of the plurality of PUSCH transmissions includes a UCI signaling at least associated with all PUSCH transmissions in an initial slot of the uplink transmission burst.

In an embodiment of the present disclosure, the control information indicates a set of HARQ process IDs that can be used for the plurality of PUSCH transmissions and indicates that the HARQ process ID field comprises one of the following based on the set of HARQ process IDs: a bitmap indicating HARQ process IDs for all PUSCH transmissions associated with the UCI signaling in sequence; one HARQ process ID for a first PUSCH transmission of all PUSCH transmissions associated with the UCI signaling; one HARQ process ID for a last PUSCH transmission of all PUSCH transmissions associated with the UCI signaling; and one shared HARQ process ID for all PUSCH transmissions associated with the UCI signaling.

According to yet another embodiment of the present disclosure, an apparatus may include: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present disclosure with the at least one receiver, the at least one transmitter and the at least one processor.

Embodiments of the present disclosure provide a technical solution for overhead reduction for CG based uplink transmission. Accordingly, embodiments of the present disclosure can facilitate utilization of the unlicensed spectrum.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G. Persons skilled in the art know very well that, with the development of network architecture and new service scenarios, the embodiments in the present disclosure are also applicable to similar technical problems.

Figure 1:
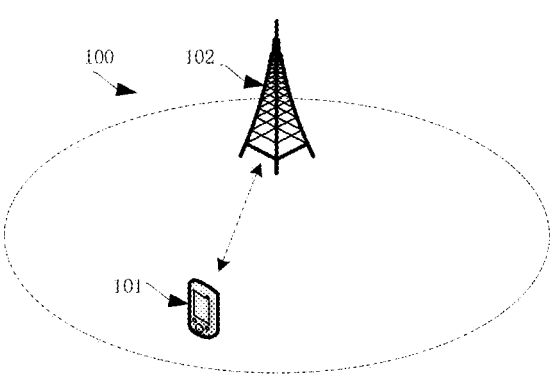
FIG. 1 is a schematic diagram illustrating an exemplary wireless communication system 100 according to an embodiment of the present disclosure.

FIG. 1 is a schematic diagram illustrating an exemplary wireless communication system 100 according to an embodiment of the present disclosure.

As shown in FIG. 1, the wireless communication system 100 can include at least one UE 101 and at least one base station (BS) 102. Although a specific number of UEs 101 and BSs 102, e.g. only one UE 101 and one BS 102 are depicted in FIG. 1; one skilled in the art will recognize that any number of the UEs 101 and the BSs 102 may be included in the wireless communication system 100.

A UE 101 may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 101 may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE 101 may be wearable device, such as a smart watch, a fitness band, an optical head-mounted display, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

A BS 102 may be distributed over a geographic region, and generally be a part of a radio access network that may include one or more controllers communicably coupled to one or more corresponding BSs 102. In some embodiments of the present disclosure, each BS 102 may also be referred to as an access point, an access terminal, a base, a macro cell, a Node-B, an evolved Node B (eNB), a gNB, a Home Node-B, a relay node, a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In an embodiment of the present disclosure, the wireless communication system 100 is compatible with a 5G new radio of the 3GPP protocol, wherein the BS 102 can transmit data using an orthogonal frequency division multiplexing (OFDM) modulation scheme on the downlink (DL) and the UE 101 can transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In another embodiment of the present disclosure, a BS 102 may communicate with a UE 101 using other communication protocols, such as an IEEE 802.11 family of wireless communication protocols. Further, in some embodiments of the present disclosure, a BS 102 may communicate with a UE 101 over a licensed spectrum(s), whereas in some other embodiments a BS 102 may communicate with a UE 101 over an unlicensed spectrum(s). The present disclosure is not intended to be limited to the implementation of any particular wireless communication system architecture or protocol. In yet another embodiment of present disclosure, a BS 102 may communicate with a UE 101 using 3GPP 5G protocols.

Whether a wireless signal transmission on an unlicensed spectrum will be performed dependent on the result of the LBT process. Different from a typical UL scheduling transmission mechanism used by a BS to dynamically schedule a UE to perform UL transmissions, a CG based UL transmission is an UL transmission mechanism that a UE autonomously performs on pre-configured resource(s) based on pre-configured parameter(s). The preconfigured resource(s) can be referred to as CG resource(s). For a CG based UL transmission on an unlicensed spectrum, a NR-U UE may not access the CG resource if the LBT process generates a failure result. Accordingly, the CG based UL transmission will be deferred until there is another transmission opportunity, which may be after at least one slot in the best case or the next CG resource in the worst case. This will lead to underutilized resources and excessive latencies.

Figure 2:
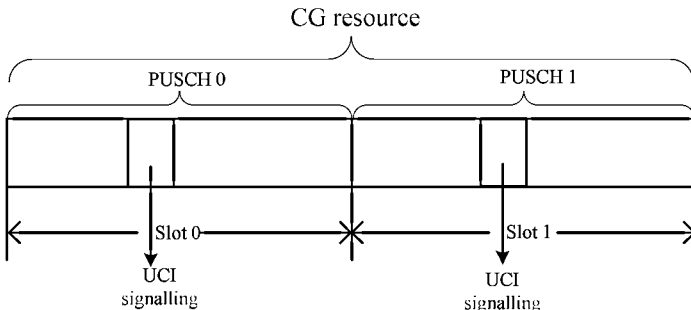
FIG. 2 is a schematic diagram illustrating an uplink transmission scheme on the unlicensed spectrum according to an embodiment of the present disclosure.

FIG. 2 is a schematic diagram illustrating an uplink transmission scheme on the unlicensed spectrum, which is also known as "Type A PUSCH mapping based approach." The "Type A PUSCH mapping based approach" means that the UE 101 can only start transmitting a PUSCH transmission on a slot boundary of a slot.

Referring to FIG. 2, the BS 102 may transmit configuration information for a CG based UL transmission (hereinafter referred to as CG configuration information), to the UE 101 for PUSCH transmissions on the unlicensed spectrum. The CG configuration information may indicate a CG resource assigned to the UE. For data to be transmitted to the BS 102 on the unlicensed spectrum, the UE 101 can generate and transmit at least one PUSCH transmission based on the CG resource by "Type A PUSCH mapping based approach."

Specifically, in the embodiment shown in FIG. 2, the CG resource may occupy two slots in time slot. According to some embodiments of the present disclosure, the CG resource may occupy at least one slot in time domain. After receiving the CG configuration information, the UE 101 may prepare two PUSCH transmissions, e.g. PUSCH 0 and PUSCH 1 to be transmitted on the CG resource. For example, the UE 101 may transmit PUSCH 0 in slot 0 and transmit PUSCH 1 in slot 1, wherein slot 0 is an initial slot (also referred to as "the first slot"). Before transmitting PUSCH 0 and PUSCH 1, the UE 101 may perform an LBT process on the unlicensed spectrum prior to PUSCH transmission in slot 0. In the case that the LBT process produces a successful result identifying the unlicensed channel as unoccupied or idle, the UE 101 may transmit the PUSCH 0 in slot 0 and then transmit the PUSCH 1 in slot 1, respectively. Each PUSCH transmission includes a UCI signaling for indicating information related to the PUSCH transmission, such as, the ID of the UE transmitting the PUSCH transmission and the HARQ process ID for the PUSCH transmission.

Otherwise, in the case that the LBT process generates a failed result, the UE 101 cannot begin transmitting the PUSCH 0 in slot 0, and accordingly the entire slot 0 will be wasted. In this case, the UE 101 has to wait for another transmission opportunity to transmit the PUSCH 0 in the next available slot or CG resource, which obviously increases the transmission time delay.

To solve the above technical problem, a PUSCH transmission can be partially punctured so that it can be transmitted across slots. However, this solution will greatly increase the operation complexity in the BS 102. According to embodiments of the present disclosure, multiple starting positions in the time domain can be provided in an initial slot for a CG based UL transmission (also referred to as "Type B PUSCH mapping based approach"), which can balance the flexible starting positions in the UE side and the operation complexity in the BS side. In the Type B PUSCH mapping based approach, the starting position can be a symbol boundary within a slot and a slot may consist of a plurality of symbols, for example 14 symbols, so that a UE 101 may start transmitting a PUSCH transmission on a symbol boundary of the slot. The PUSCH transmission may occupy a number of contiguous symbols within a single slot, and such contiguous symbols may be referred to as a sub-slot.

Generally, in the Type B PUSCH mapping based approach, since multiple starting positions in the time domain can be provided in an initial slot, the initial slot may have at least two sub-slots, and each sub-slot can be used for transmitting one PUSCH transmission. The LBT for a PUSCH transmission in a first sub-slot will be performed prior to the first sub-slot. Once the LBT process for the PUSCH transmission in the first sub-slot has failed indicating an occupied or non-idle channel, the next LBT process for the PUSCH transmission in a next sub-slot can be performed prior to the next sub-slot in sequence, and so on, until the LBT process produces a successful result. That is, there are multiple possible starting positions in the initial slot, and the UE will start performing a PUSCH transmission resulting from the successful LBT process result on its corresponding starting position, which is a symbol boundary within the initial slot. For the non-initial slot, the PUSCH transmission(s) to be transmitted in the non-initial slot can also be configured with "Type A PUSCH mapping based approach" or "Type B PUSCH mapping based approach."

Figure 3:
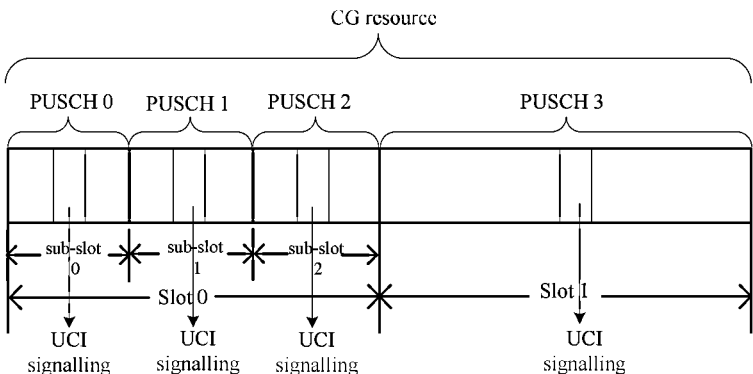
FIG. 3 is a schematic diagram illustrating an exemplary embodiment of the "Type B PUSCH mapping based approach" according to an embodiment of the present disclosure.

FIG. 3 is a schematic diagram illustrating an exemplary embodiment of the "Type B PUSCH mapping based approach" according to an embodiment of the present disclosure.

Referring to FIG. 3, the BS 102 may transmit CG configuration information to a UE 101 for PUSCH transmissions on the unlicensed spectrum. The CG configuration information may indicate a CG resource for PUSCH transmissions. The CG resource may occupy at least one slot in time domain, and the initial slot (also referred to as "the first slot") of the at least one slot may include at least two sub-slots. Each sub-slot is used for transmitting a single PUSCH transmission, and each non-initial slot is also used for transmitting a single PUSCH transmission. After receiving the CG configuration information, the UE 101 may transmit at least one PUSCH based on the CG configuration information in the case that an associated LBT process generates a successful result, wherein each PUSCH transmission includes a UCI signaling for indicating information related to the PUSCH transmission, such as, for example, the ID of the UE transmitting the PUSCH transmission and the HARQ process ID for the PUSCH transmission.

Specifically, in the embodiment shown in FIG. 3, the CG configuration information may indicate a CG resource for PUSCH transmission, wherein the CG resource may occupy two slots, e.g., slot 0 and slot 1 in time domain. Slot 0 is an initial slot and, in this example, includes three sub-slots, i.e. sub-slot 0, sub-slot 1, and sub-slot 2. Each sub-slot corresponds to a PUSCH transmission, e.g. sub-slot 0 corresponding to PUSCH 0, sub-slot 1 corresponding to PUSCH 1, and sub-slot 2 corresponding to PUSCH 2. Slot 1 is a non-initial slot and corresponding to PUSCH 3. Persons skilled in the art should understand that the above relationship between a sub-slot and a PUSCH transmission is only for illustrating the embodiments of the present disclosure, which can vary dependent on the real transmission situation in the UE 101.

Prior to sub-slot 0, the UE 101 may perform an LBT process on the unlicensed spectrum. In the case that the LBT process generates a successful result, the UE 101 can transmit the PUSCH 0 in the sub-slot 0, the PUSCH 1 in the sub-slot 1, the PUSCH 2 in the sub-slot 2, and the PUSCH 3 in the slot 1. Otherwise, the UE 101 will not transmit the PUSCH 0 in the slot 0, and, instead, will perform another LBT procedure on the unlicensed spectrum prior to the sub-slot 1. Similarly, in the case that another LBT procedure generates a successful result; the UE 101 may transmit the PUSCH 1 in the sub-slot 1, the PUSCH 2 in the sub-slot 2, and the PUSCH 3 in the slot 1. Otherwise, the UE 101 will not transmit the PUSCH 1 in the sub-slot 1 and will perform yet another LBT procedure on the unlicensed spectrum prior to the sub-slot 2. In the case that yet another LBT procedure generates a successful result, the UE 101 may transmit the PUSCH 2 in the sub-slot 2 and the PUSCH 3 in the slot 1. Otherwise, in the case that yet another LBT procedure prior to sub-slot 2 generates a failure result, the UE 101 will not transmit the PUSCH 2 in the sub-slot 2 and will perform yet another LBT procedure on the unlicensed spectrum prior to the slot 1. In the case that yet another LBT procedure prior to slot 1 generates a successful result, the UE 101 may transmit the PUSCH 3 in the slot 1. Otherwise, the UE 101 may not transmit the PUSCH 3 in the slot 1 and the entire slot 1 will be wasted. In another embodiment of the present disclosure, in the case that yet another LBT procedure prior to sub-slot 2 generates a failure result, the UE 101 may treat slot 1 as the initial slot, and thus slot 1 may include at least two sub-slots for PUSCH transmissions and the same process as slot 0 may be performed on slot 1, which may depend on UE implementations. Obviously, using multiple starting positions increases the spectrum efficiency.

However, carrying a UCI signaling in each PUSCH transmission means a considerable overhead. Especially, for the Type B PUSCH mapping based approach, carrying a UCI signaling in each PUSCH transmission within a sub-slot will significantly increase the overhead associated with the UCI signaling. Hence, some embodiments of the present disclosure provide an improved solution, wherein the UCI signaling is at least associated with all PUSCH transmissions in an initial slot of an uplink transmission burst. An uplink transmission burst may be defined as a set of successive uplink transmissions, for example PUSCH transmissions from a given UE without gaps or with gaps no more than 16 μs among each other. Transmissions from a UE having gaps more than 16 μs among each other can be considered as separated uplink transmissions. Therefore, embodiments of the present disclosure can at least improve channel utilization efficiency while reduce the UCI signaling overhead. Persons skilled in the art can understand that "16 μs" is just an example time limit, which can change depending on network configuration. In some other embodiments of the present disclosure, the time limit "16 μs" may be changed to a number of symbols.

Figure 4:
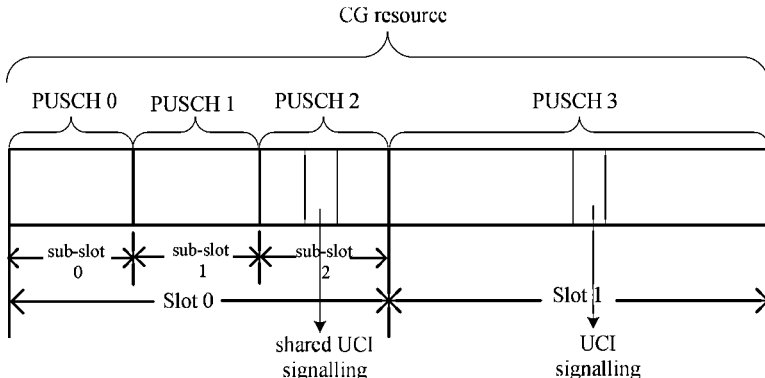
FIG. 4 is a schematic diagram illustrating an uplink PUSCH transmission scheme according to another embodiment of the present disclosure.
Figure 5:
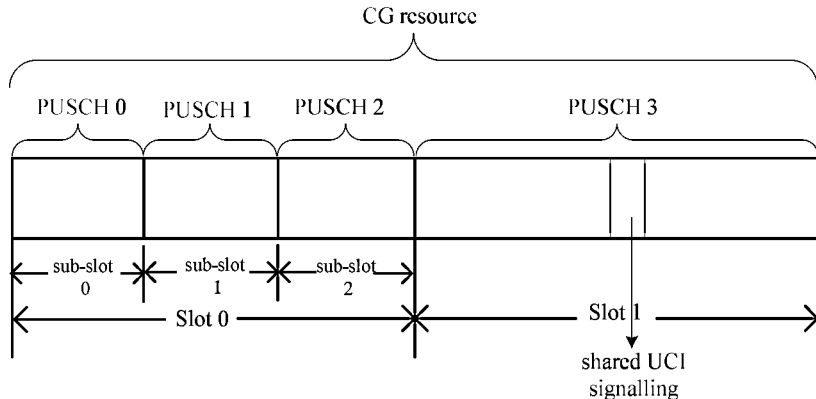
FIG. 5 is a schematic diagram illustrating an uplink PUSCH transmission scheme according to yet another embodiment of the present disclosure.

FIG. 4 is a schematic diagram illustrating an uplink PUSCH transmission scheme according to another embodiment of the present disclosure. FIG. 5 is a schematic diagram illustrating an uplink PUSCH transmission scheme according to yet another embodiment of the present disclosure.

Referring to FIG. 4 and FIG. 5, a BS 102 may transmit control information to the UE 101 for PUSCH transmissions on the unlicensed spectrum. The control information may include the CG configuration information which may indicate a CG resource for the PUSCH transmissions. In the embodiments in FIG. 4 and FIG. 5, the CG resource may occupy two slots, e.g., slot 0 and slot 1 in time domain.

In the embodiments shown in FIG. 4 and FIG. 5, Slot 0 is an initial slot, and includes at least two sub-slots, for example, sub-slot 0, sub-slot 1, and sub-slot 2. Each sub-slot can be used to transmit one PUSCH transmission, e.g., the sub-slot 0 can be used to transmit PUSCH 0, the sub-slot 1 can be used to transmit PUSCH 1, and the sub-slot 2 can be used to transmit PUSCH 2. Slot 1 is a non-initial slot and is used to transmit PUSCH 3. Before transmitting the PUSCH 0, the UE 101 may perform an LBT procedure on the unlicensed spectrum. In this example, assuming that the LBT procedure generates a successful result, the UE 101 can transmit the PUSCH 0 in the sub-slot 0, the PUSCH 1 in the sub-slot 1, the PUSCH 2 in the sub-slot 2, and the PUSCH 3 in the slot 1. These PUSCH transmissions may be in an uplink transmission burst. Different from FIG. 3, in the embodiment of FIG. 4, one of the four PUSCH transmissions may include a UCI signaling associated with all PUSCH transmissions in the initial slot of the uplink transmission burst. That is, the UCI signaling is a shared UCI signaling for all PUSCH transmissions in the initial slot of the uplink transmission burst. In an embodiment of the present disclosure, the shared UCI signaling may be only associated with all PUSCH transmissions in the initial slot of the uplink transmission burst, e.g. the PUSCH 0, the PUSCH 1 and the PUSCH 2 in the slot 0 as shown in FIG. 4. In another embodiment of the present disclosure, the shared UCI signaling may be associated with all PUSCH transmissions in the initial slot and one or more consecutive PUSCH transmissions in one or more consecutive non-initial slots of the uplink transmission burst subsequent to the initial slot, e.g. the PUSCH 0, the PUSCH 1, and the PUSCH 2 in slot 0 and the PUSCH 3 in slot 1 as shown in FIG. 5.

The control information may indicate a position of the UCI signaling in the plurality of PUSCH transmissions. Specifically, the shared UCI signaling may be transmitted within any PUSCH transmission of all PUSCH transmissions associated with the shared UCI signaling. For example, the shared UCI signaling may be within the last PUSCH transmission of all PUSCH transmission associated with the shared UCI signaling.

According to the embodiment shown in FIG. 4, the shared UCI signaling may be associated with three PUSCH transmissions, i.e. the PUSCH 0, the PUSCH 1, and the PUSCH 2 in the initial slot, and the shared UCI signaling may be within the last PUSCH transmission in the initial slot of the uplink transmission burst, for example, within the PUSCH 2 as shown in FIG. 4. In this embodiment, the PUSCH 3 may include another UCI signaling associated with the PUSCH 3 only.

However, according to another embodiment of the present disclosure shown in FIG. 5, the shared UCI signaling may be associated with all of the PUSCH transmissions in an UL transmission burst, wherein the shared UCI signaling may be transmitted within the last PUSCH transmission of the uplink transmission burst. Specifically, FIG. 5 shows an uplink transmission burst including four PUSCH transmissions, i.e., PUSCH 0, PUSCH 1, PUSCH 2, and PUSCH 3. Only PUSCH 3, which is the last PUSCH transmission of the uplink transmission burst, includes the UCI signaling. In this exemplary embodiment, the UCI signaling is associated with all four PUSCH transmissions in the uplink transmission burst.

Figure 6:
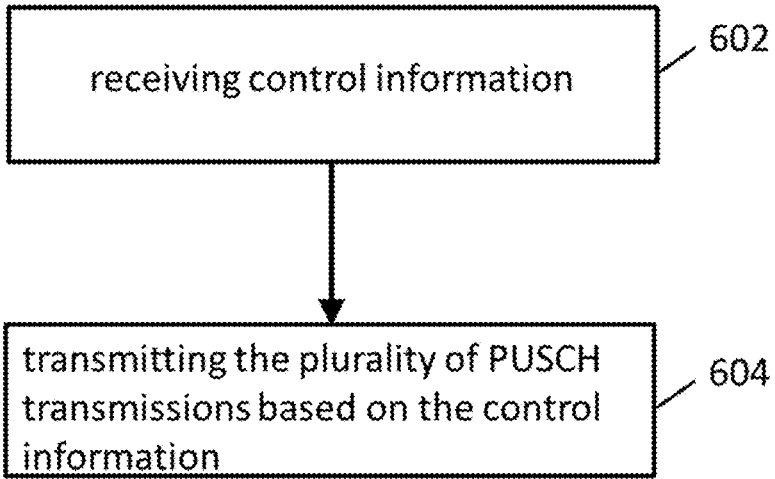
FIG. 6 is a flow chart illustrating a method for overhead reduction for CG based uplink transmission according to an embodiment of the present disclosure.

FIG. 6 is a flow chart illustrating a method for overhead reduction for CG based uplink transmission according to an embodiment of the present disclosure. The method may be implemented by the UE 101 in the exemplary wireless communication system 100 as shown in FIG. 1.

As shown in FIG. 6, in step 602, the UE 101 may receive control information at least for a plurality of PUSCH transmissions in an uplink transmission burst. The uplink transmission burst may be defined as a set of successive uplink transmissions, for example, PUSCH transmissions from a given UE without gaps or with gaps no more than 16 μs among each other. The control information may be a high-layer signaling, for example, a radio resource control (RRC) signaling or physical layer control information, for example, downlink control information (DCI).

In an embodiment of the present disclosure, the control information may at least include CG configuration information. The CG configuration information may indicate the CG resource used for PUSCH transmissions, wherein the CG resource may occupy at least one slot in time domain and the initial slot of the at least one slot may include multiple sub-slots for PUSCH transmissions. Taking FIG. 4 as an example, the CG resource may occupy two slots, e.g. slot 0 and slot 1 in time domain, allocated for PUSCH transmissions. Wherein slot 0 is an initial slot and includes multiple sub-slots, for example, sub-slot 0, sub-slot 1, and sub-slot 2, for each respective PUSCH transmission. That is, the CG resource in slot 0 includes three starting positions and can be ideally used for transmitting three PUSCH transmissions. Slot 1 is a non-initial slot used for one PUSCH transmission.

After receiving the control information, in step 604, the UE 101 may transmit a plurality of PUSCH transmissions in the uplink transmission burst based on the control information. Wherein one of the plurality of PUSCH transmissions may include a UCI signaling associated with all PUSCH transmissions in an initial slot of the uplink transmission burst. In an embodiment of the present disclosure, the UCI signaling may be associated with all PUSCH transmissions in an initial slot of the uplink transmission burst, e.g. the PUSCH 0, the PUSCH 1, and the PUSCH 2 in slot 0 as shown in FIG. 4. In another embodiment of the present disclosure, the shared UCI signaling may be associated with all PUSCH transmissions in the initial slot and one or more consecutive PUSCH transmissions in the one or more non-initial slots subsequent to the initial slot of the uplink transmission burst, e.g. the PUSCH 0, the PUSCH 1, and the PUSCH 2 in slot 0 and the PUSCH 3 in slot 1 as shown in FIG. 5.

According to some embodiments of the present disclosure, the control information may indicate a position of the shared UCI signaling in the plurality of PUSCH transmissions. Specifically, the shared UCI signaling may be within any PUSCH transmission of all PUSCH transmissions associated with the shared UCI signaling, for example, the shared UCI signaling may be within a last PUSCH transmission of all PUSCH transmissions associated with the shared UCI signaling.

In an embodiment of the present disclosure, the UCI signaling may be associated with all PUSCH transmissions in the initial slot, and the control information may indicate that the UCI signaling is within the last PUSCH transmission of an initial slot of the uplink transmission burst. In another embodiment of the present disclosure, the UCI signaling may be associated with all of the plurality of PUSCH transmissions in the uplink transmission burst and the control information may indicate that the UCI signaling is within a last PUSCH transmission in the uplink transmission burst.

Specifically, assuming that the CG configuration information in the control information may indicate that the resource in slot 0 and slot 1 are used for PUSCH transmissions. Wherein slot 0 is an initial slot and includes at least two sub-slots, for example, in this exemplary embodiment three sub-slots are used, i.e., sub-slot 0, sub-slot 1, and sub-slot 2. Each sub-slot can be used for transmitting a corresponding PUSCH transmission. Slot 1 is a non-initial slot and the entire slot 1 is used for transmitting one PUSCH transmission. The UE 101 may transmit PUSCH 0 in sub-slot 0, PUSCH 1 in sub-slot 1, PUSCH 2 in sub-slot 2, and PUSCH 3 in slot 1, respectively, in the case the LBT process returns a successful result. The four PUSCH transmissions, e.g. the PUSCH 0, the PUSCH 1, the PUSCH 2 and the PUSCH 3 can be referred as an uplink transmission burst because they are transmitted in successive sub-slots or slots. One PUSCH transmission selected from the PUSCH 0, the PUSCH 1, the PUSCH 2, and the PUSCH 3 may include one UCI signaling for all of the four PUSCH transmissions, so that the UCI signaling overhead can be reduced. The location of the UCI signaling may be set based on the control information. For example, in the case that the control information indicates that the UCI signaling should be within the last PUSCH transmission of an initial slot of the uplink transmission burst, the UCI signaling may be included within PUSCH 2 of the uplink transmission burst. In the case that the control information indicates that the UCI signaling should be within the last PUSCH in the uplink transmission burst, the UCI signaling may be included within PUSCH 3 of the uplink transmission burst.

According to an embodiment of the present disclosure, the UCI signaling may include a hybrid automatic repeat request (HARQ) process ID field. According to another embodiment of the present disclosure, the UCI signaling may further include at least one of the following fields: new data indicator (NDI) field, redundancy version (RV) field, user equipment (UE) ID field, starting and ending position field, transmission parameter field, and code block group transmission information (CBGTI) field.

According to some embodiments of the present disclosure, the HARQ process ID field may be configured based on one of the following options: a bitmap indicating HARQ process IDs for all PUSCH transmissions associated with the UCI signaling in sequence, one HARQ process ID for a first PUSCH transmission of all PUSCH transmissions associated with the UCI signaling, one HARQ process ID for a last PUSCH transmission of all PUSCH transmissions associated with the UCI signaling, and one shared HARQ process ID for all PUSCH transmissions associated with the UCI signaling.

In an embodiment of the present disclosure, the control information may indicate a set of HARQ process IDs that can be used for the plurality of PUSCH transmissions.

In another embodiment of the present disclosure, the control information may indicate the option based on which the HARQ process ID field is configured. For example, the control information may include 2-bit information to indicate the option based on which the HARQ process ID field is configured. Specifically, "00" may indicate that the HARQ process ID field is configured based on a bitmap indicating HARQ process IDs for all PUSCH transmissions associated with the UCI signaling in sequence, and then the HARQ process ID field may include a bitmap indicating HARQ process IDs for all of the PUSCH transmissions associated with the UCI signaling in sequence. "01" may indicate that the HARQ process ID field is configured based on one HARQ process ID for a first PUSCH transmission of all PUSCH transmissions associated with the UCI signaling, and then the HARQ process ID field may include one HARQ process ID for the first PUSCH transmission of all PUSCH transmissions associated with the UCI signaling. "10" may indicate that the HARQ process ID field is configured based on one HARQ process ID for a last PUSCH transmission of all PUSCH transmissions associated with the UCI signaling, and then the HARQ process ID field may include one HARQ process ID for the last PUSCH transmission of all PUSCH transmissions associated with the UCI signaling. "11" may indicate that the HARQ process ID field is configured based on one shared HARQ process ID for all PUSCH transmissions associated with the UCI signaling, and then the HARQ process ID field may include one shared HARQ process ID for all PUSCH transmissions associated with the UCI signaling. Persons skilled in the art can understand that the above examples are only for illustrative purpose, and other option indicating methods taught or suggested in the present disclosure can also be applicable.

In yet another embodiment of the present disclosure, the control information may include an indictor indicating a type of the UCI signaling being a complete UCI signaling or a simplified UCI signaling, wherein the type of the UCI signaling may indicate the option based on which the HARQ process ID field is configured. For example, the control information may include 1-bit information to indicate a type of the UCI signaling being a complete UCI signaling or a simplified UCI signaling. Specifically, "0" may indicate that the UCI is a complete UCI, and thus the HARQ process ID field includes a bitmap indicating HARQ process IDs for all PUSCH transmissions associated with the UCI signaling in sequence. "1" may indicate that the UCI is a simplified UCI and thus the HARQ process ID field may be configured based on one of the following options: one HARQ process ID for a first PUSCH transmission of all PUSCH associated with the UCI signaling, one HARQ process ID for a last PUSCH transmission of all PUSCH transmissions associated with the UCI signaling, and one shared HARQ process ID for all PUSCH transmissions associated with the UCI signaling. In this case, selecting which option from the three options may be predefined for the BS 102 and the UE 101.

In yet another embodiment of the present disclosure, the control information may not indicate the option based on which the HARQ process ID field is configured. In this case, the UE 101 itself may determine the option based on which the HARQ process ID field is configured and transmit an indicator indicating the option to the BS 102. For example, the UE 101 may transmit 2-bit information as illustrated above to indicate the option based on which the HARQ process ID field is configured.

In yet another embodiment of the present disclosure, the control information may not indicate the option based on which the HARQ process ID field is configured. In this case, the UE 101 itself may determine the type of the UCI signaling being a complete UCI signaling or a simplified UCI signaling and then transmit an indictor indicating the type of the UCI signaling, wherein the type of the UCI signaling may indicate the option based on which the HARQ process ID field is configured. For example, the indicator may be 1-bit information as illustrated above.

For example, assuming that the set of HARQ process IDs indicated by the control information may be {2, 4, 6, 7, 8} and the UCI signaling is associated with four consecutive PUSCH transmissions, e.g. PUSCH 0, PUSCH 1, and PUSCH 2 in the initial slot and PUSCH 3 in the consecutive non-initial slot subsequent to the initial slot, the HARQ process ID field of the UCI signaling can be handled in the following manners.

In the case that the control information indicates or the UE 101 itself determines that the HARQ process ID field may include a bitmap indicating HARQ process IDs for all PUSCH transmissions associated with the UCI signaling in a sequence, the UE 101 may select HARQ process ID "2" for PUSCH 0, HARQ process ID "4" for PUSCH 1, HARQ process ID "7" for PUSCH 2, and HARQ process ID "8" for PUSCH 3, respectively, and fill the bitmap with "2", "4", "7", and "8" in sequence. After receiving the UCI signaling, the BS 102 may determine that the HARQ process IDs for PUSCH 0, PUSCH 1, PUSCH 2, PUSCH 3 are "2", "4", "7", and "8", respectively.

In the case that the control information indicates or the UE 101 itself determines that the HARQ process ID field may include one HARQ process ID for a first PUSCH transmission of all PUSCH transmissions associated with the UCI signaling, the UE 101 may select one HARQ process ID from the set of HARQ process IDs for the first PUSCH transmission and determine HARQ process IDs for the remaining PUSCH transmissions from the set of HARQ process IDs in ascending sequence based on the HARQ process ID for the first PUSCH transmission. For example, the UE may select HARQ process ID "2" for PUSCH 0 and the HARQ process IDs for PUSCH 1, PUSCH 2, PUSCH 3 may be "4", "6", and "7" by default. Then the UE 101 may just fill the HARQ process ID field with "2". After receiving the UCI signaling, the BS 102 may know that the HARQ process ID for PUSCH 0 is "2," and then the BS 102 may determine HARQ process IDs for the remaining PUSCH transmissions from the set of HARQ process IDs in ascending sequence based on the HARQ process ID for the first PUSCH transmission, for example, determine that the HARQ process IDs for PUSCH 1, PUSCH 2 and PUSCH 3 are "4", "6", and "7", respectively.

In the case that the control information indicates or the UE 101 itself determines that the HARQ process ID field may include one HARQ process ID for the last PUSCH transmission of all PUSCH transmissions associated with the UCI signaling, the UE 101 may select one HARQ process ID from the set of HARQ process IDs for the last and determine HARQ process IDs for the remaining PUSCH transmissions from the set of HARQ process IDs in descending sequence based on the HARQ process ID for the last PUSCH transmission. For example, the UE may select HARQ process ID "7" for PUSCH 3, and the HARQ process IDs for PUSCH 2, PUSCH 1, PUSCH 0 may be "6", "4", and "2" by default. Then the UE 101 may just fill the HARQ process ID field with "7". After receiving the UCI signaling, the BS 102 may know that the HARQ process ID for PUSCH 3 is "7," and then the BS 102 may determine HARQ process IDs for the remaining PUSCH transmissions from the set of HARQ process IDs in ascending sequence based on the HARQ process ID for the last PUSCH transmission, for example, determine that the HARQ process IDs for PUSCH 2, PUSCH 1, PUSCH 0 may be "6", "4", and "2", respectively.

In the case that the control information indicates or the UE 101 itself determines that the HARQ process ID field may include one shared HARQ process ID for all PUSCH transmissions associated with the UCI signaling, the UE 101 may select one HARQ process ID from the set of HARQ process IDs. For example, the UE may select HARQ process ID "7" for all of PUSCH 0, PUSCH 1, PUSCH 2, and PUSCH 3 and fill the HARQ process ID field with "7". After receiving the UCI signaling, the BS 102 may know that the HARQ process ID for all of PUSCH 0, PUSCH 1, PUSCH 2, and PUSCH 3 is "7."

According to some embodiments of the present disclosure, the NDI field may be configured based on one of the following options: a bitmap indicating NDIs for all PUSCH transmissions associated with the UCI signaling in sequence, and one shared NDI for all PUSCH transmissions associated with the UCI signaling.

In an embodiment of the present disclosure, the control information may indicate the option based on which the NDI field is configured. For example, the control information may include 1-bit information to indicate the option based on which the NDI field is configured. "0" may indicate that the NDI field is configured based on a bitmap indicating NDIs for all PUSCH transmissions associated with the UCI signaling in sequence, and then the NDI field may include a bitmap indicating NDIs for all PUSCH transmissions associated with the UCI signaling in sequence. "1" may indicate that the NDI field is configured based on one shared NDI for all PUSCH transmissions associated with the UCI signaling, and then the NDI field may include one shared NDI for all PUSCH transmissions associated with the UCI signaling.

In another embodiment of the present disclosure, the control information may not indicate the option based on which the NDI field is configured, whereas the UE 101 itself may determine the option and indicate the option to the BS 102. For example, the UE 101 may transmit 1-bit information as illustrated above to indicate the option based on which the NDI field is configured.

In yet another embodiment of the present disclosure, the indictor indicating a type of the UCI signaling included in the control information or transmitted by the UE may also indicate the option based on which the NDI field is configured. For example, the indicator may be 1-bit information. "0" may indicate that the UCI is a complete UCI, and thus the NDI field includes a bitmap indicating NDIs for all PUSCH transmissions associated with the UCI signaling in sequence. "1" may indicate that the UCI is a simplified UCI, and thus the NDI field may include one shared NDI for all PUSCH transmissions associated with the UCI signaling.

According to some embodiments of the present disclosure, the RV field may be configured based on one of the following options: a bitmap indicating RVs for all PUSCH transmissions associated with the UCI signaling in sequence, and one shared RV for all PUSCH transmissions associated with the UCI signaling.

In an embodiment of the present disclosure, the control information may indicate the option based on which the RV field is configured. For example, the control information may include 1-bit information to indicate the option based on which the RV field is configured. "0" may indicate that the RV field is configured based on a bitmap indicating RVs for all PUSCH transmissions associated with the UCI signaling in sequence, and then the RV field may include a bitmap indicating RVs for all PUSCH transmissions associated with the UCI signaling in sequence. "1" may indicate that the RV field is configured based on one shared RV for all PUSCH transmissions associated with the UCI signaling, and then the RV field may include one shared RV for all PUSCH transmissions associated with the UCI signaling.

In another embodiment of the present disclosure, the control information may not indicate the option based on which the RV field is configured, whereas the UE 101 itself may determine the option and indicate the option to the BS 102. For example, the UE 101 may transmit 1-bit information as illustrated above to indicate the option based on which the RV field is configured.

In yet another embodiment of the present disclosure, the indictor indicating a type of the UCI signaling included in the control information or transmitted by the UE 101 may also indicate the option based on which the RV field is configured. For example, the indicator may be 1-bit information. "0" may indicate that the UCI is a complete UCI, and thus the RV field includes a bitmap indicating RVs for all PUSCH transmissions associated with the UCI signaling in sequence. "1" may indicate that the UCI is a simplified UCI, and thus the RV field may include one shared RV for all PUSCH transmissions associated with the UCI signaling.

According to some embodiments of the present disclosure, the UE ID field may include one UE ID for all PUSCH transmissions associated with the UCI signaling.

According to some embodiments of the present disclosure, the starting and ending position field may include a starting position field indicating a starting position of a first PUSCH transmission of all PUSCH transmissions associated with the UCI signaling and an ending position field indicating an ending position of a last PUSCH transmission of all PUSCH transmissions associated with the UCI signaling.

According to some embodiments of the present disclosure, the transmission parameter field may be configured based on one of the following options: a bitmap indicating transmission parameters for all PUSCH transmissions associated with the UCI signaling in sequence, and one shared transmission parameter for all PUSCH transmissions associated with the UCI signaling. The transmission parameter may include at least one of the followings: modulation and coding scheme (MCS), precoding matrix indicators (PMI), rank indication (RI), sounding reference signal resource indicator (SRI), etc.

In an embodiment of the present disclosure, the control information may indicate the option based on which the transmission parameter field is configured. For example, the control information may include 1-bit information to indicate the option based on which the transmission parameter field is configured. "0" may indicate that the transmission parameter field is configured based on a bitmap indicating transmission parameters for all PUSCH transmissions associated with the UCI signaling in sequence, and then the transmission parameter field may include a bitmap indicating transmission parameters for all PUSCH transmissions associated with the UCI signaling in sequence. "1" may indicate that the transmission parameter field is configured based on one shared transmission parameter for all PUSCH transmissions associated with the UCI signaling, and then the transmission parameter field may include one shared transmission parameter for all PUSCH transmissions associated with the UCI signaling.

In another embodiment of the present disclosure, the control information may not indicate the option based on which the transmission parameter field is configured, whereas the UE 101 itself may determine the option and indicate the option to the BS 102. For example, the UE 101 may transmit 1-bit information as illustrated above to indicate the option based on which the transmission parameter field is configured.

In yet another embodiment of the present disclosure, the indictor indicating a type of the UCI signaling included in the control information or transmitted by the UE 101 may also indicate the option based on which the transmission parameter field is configured. For example, the indicator may be 1-bit information. "0" may indicate that the UCI is a complete UCI, and thus the transmission parameter field includes a bitmap indicating transmission parameters for all PUSCH transmissions associated with the UCI signaling in sequence. "1" may indicate that the UCI is a simplified UCI, and thus the transmission parameter field may include one shared transmission parameter for all of all PUSCH transmissions associated with the UCI signaling.

According to some embodiments of the present disclosure, the CBGTI field may include a bitmap indicating CBGTI for all of all PUSCH transmissions associated with the UCI signaling.

Figure 7:
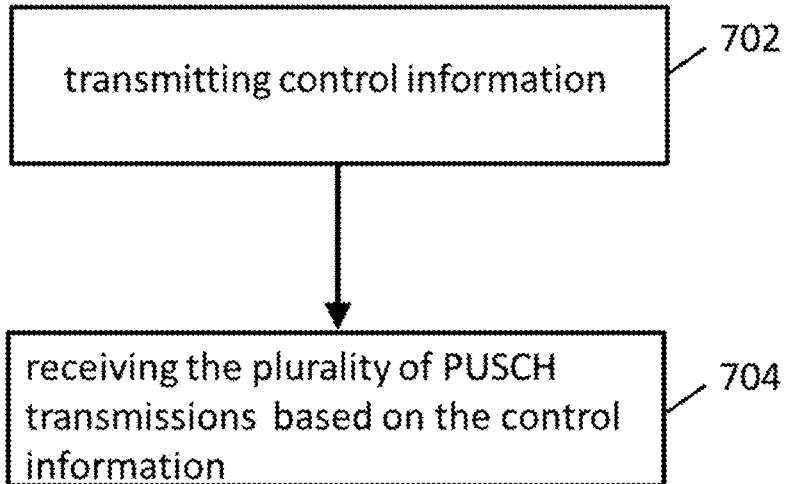
FIG. 7 is a flow chart illustrating a method for overhead reduction for CG based uplink transmission according to another embodiment of the present disclosure.

FIG. 7 is a flow chart illustrating a method for overhead reduction for the CG based uplink transmission according to another embodiment of the present disclosure. The method may be implemented by a BS 102 in an exemplary wireless communication system 100 as shown in FIG. 1.

As shown in FIG. 7, in step 702, the BS 102 may transmit control information at least for a plurality of PUSCH transmissions by the UE 101 in an uplink transmission burst. An uplink transmission burst may be defined as a set of successive uplink transmissions, for example PUSCH transmissions from a given UE without gaps or with gaps no more than 16 μs among each other. The control information may be high-layer signaling, for example, a radio resource control (RRC) signaling or physical layer control information, for example, downlink control information (DCI).

In an embodiment of the present disclosure, the control information may at least include CG configuration information. The CG configuration information may indicate the CG resource used for PUSCH transmissions, wherein the CG resource may occupy at least one slot in time domain and the initial slot of the at least one slot may include multiple sub-slots for separate PUSCH transmissions. Taking FIG. 4 as an example, the CG resource may occupy two slots, e.g., slot 0 and slot 1 in time domain for PUSCH transmission. Wherein slot 0 is an initial slot and includes multiple sub-slots, for example sub-slot 0, sub-slot 1, and sub-slot 2 each for respective PUSCH transmission. That is, the CG resource in slot 0 provides three starting positions and can be ideally used for transmitting three PUSCH transmissions. Slot 1 is a non-initial slot used for one PUSCH transmission.

After transmitting the control information, in step 704, the BS 102 may receive the plurality of PUSCH transmissions in the uplink transmission burst based on the control information. Wherein one of the plurality of PUSCH transmissions may include a UCI signaling associated with all PUSCH transmissions in an initial slot of the uplink transmission burst. That is, the UCI signaling is a shared UCI signaling associated with all PUSCH transmissions in the initial slot of the uplink transmission burst. In an embodiment of the present disclosure, the UCI shared signaling may be associated with all PUSCH transmissions in the initial slot of the uplink transmission burst, e.g., the PUSCH 0, the PUSCH 1, and the PUSCH 2 in slot 0 as shown in FIG. 4. In another embodiment of the present disclosure, the shared UCI signaling may be associated with all PUSCH transmissions in the initial slot and one or more consecutive PUSCHs in the one or more consecutive non-initial slots subsequent to the initial slot of the uplink transmission burst, e.g., the PUSCH 0, the PUSCH 1, the PUSCH 2 in slot 0 and the PUSCH 3 in slot 1 as shown in FIG. 5.

According to some embodiments of the present disclosure, the control information may indicate a position of the UCI signaling in the plurality of PUSCH transmissions. Specifically, the shared UCI signaling may be within any PUSCH transmission of all PUSCH transmission s associated with the shared UCI signaling, for example, the shared UCI signaling may be within the last PUSCH transmission of all PUSCH transmissions associated with the shared UCI signaling.

In an embodiment of the present disclosure, the UCI signaling may be associated with all PUSCH transmissions in the initial slot, and the control information may indicate that the UCI signaling is within the last PUSCH transmission in an initial slot of the uplink transmission burst. In another embodiment of the present disclosure, the UCI signaling may be associated with all of the plurality of PUSCH transmissions in the uplink transmission burst, and the control information may indicate that the UCI signaling is within the last PUSCH transmission in the uplink transmission burst.

Specifically, assuming that the CG configuration information in the control information may indicate that the resource in slot 0 and slot 1 are used for PUSCH transmissions. Wherein slot 0 is an initial slot, and includes at least two sub-slots, e.g., three sub-slots, sub-slot 0, sub-slot 1, and sub-slot 2. Each sub-slot can be used for transmitting a corresponding PUSCH transmission. Slot 1 is a non-initial slot, and the whole slot 1 is used for transmitting one PUSCH transmission. The BS 102 may receive PUSCH 0 in sub-slot 0, PUSCH 1 in sub-slot 1, PUSCH 2 in sub-slot 2, PUSCH 3 in slot 1, respectively from the UE 101. The four PUSCH transmissions, e.g., PUSCH 0, PUSCH 1, PUSCH 2, and PUSCH 3 can be referred as an uplink transmission burst because they are transmitted in successive sub-slots or slots. One PUSCH of PUSCH 0, PUSCH 1, PUSCH 2, and PUSCH 3 may include one UCI signaling for all of the four PUSCH transmissions, so that the UCI signaling overhead can be reduced. The location of the UCI signaling may be set based on the control information. For example, in the case that the control information indicates that the UCI signaling should be within the last PUSCH transmission in an initial slot of the uplink transmission burst, the UCI signaling may be included within PUSCH 2 of the uplink transmission burst. In the case that the control information indicates that the UCI signaling should be within the last PUSCH transmission in the uplink transmission burst, the UCI signaling may be included within PUSCH 3 in the uplink transmission burst.

According to an embodiment of the present disclosure, the UCI signaling may include a HARQ process ID field. According to another embodiment of the present disclosure, the UCI signaling may further include at least one of the following fields: NDI field, RV field, UE ID field, starting and ending position field, transmission parameter field, and CBGTI field.

According to some embodiments of the present disclosure, the HARQ process ID field may be configured based on one of the following options (in other words, the HARQ process ID field may include one of the following): a bitmap indicating HARQ process IDs for all PUSCH transmissions associated with the UCI signaling in sequence; one HARQ process ID for the first PUSCH transmission of all PUSCH transmissions associated with the UCI signaling, one HARQ process ID for the last PUSCH transmission of all PUSCH transmissions associated with the UCI signaling, and one shared HARQ process ID for all PUSCH transmissions associated with the UCI signaling.

In an embodiment of the present disclosure, the control information may indicate a set of HARQ process IDs that can be used for the plurality of PUSCH transmissions.

In another embodiment of the present disclosure, the control information may indicate the option based on which the HARQ process ID field is configured. For example, the control information may include 2-bit information to indicate the option based on which the HARQ process ID field is configured. Specifically, "00" may indicate that the HARQ process ID field is configured based on a bitmap indicating HARQ process IDs for all PUSCH transmissions associated with the UCI signaling in sequence, and then the HARQ process ID field may include a bitmap indicating HARQ process IDs for all PUSCH transmissions associated with the UCI signaling in sequence, "01" may indicate that the HARQ process ID field is configured based on one HARQ process ID for the first PUSCH transmission of all PUSCH transmissions associated with the UCI signaling, and then the HARQ process ID field may include one HARQ process ID for the first PUSCH transmission of all PUSCH transmissions associated with the UCI signaling. "10" may indicate that the HARQ process ID field is configured based on one HARQ process ID for the last PUSCH transmission of all PUSCH transmissions associated with the UCI signaling, and then the HARQ process ID field may include one HARQ process ID for the last PUSCH transmission of all PUSCH transmissions associated with the UCI signaling. "11" may indicate that the HARQ process ID field is configured based on one shared HARQ process ID for all PUSCH transmissions associated with the UCI signaling, and then the HARQ process ID field may include one shared HARQ process ID for all PUSCH transmissions associated with the UCI signaling. Persons skilled in the art can understand that the above examples are only for illustrative purpose, and other option indicating methods taught or suggested in the present disclosure can also be applicable.

In yet another embodiment of the present disclosure, the control information may include an indictor indicating a type of the UCI signaling being a complete UCI signaling or a simplified UCI signaling, wherein the type of the UCI signaling may indicate the option based on which the HARQ process ID field is configured. For example, the control information may include 1-bit information to indicate a type of the UCI signaling being a complete UCI signaling or a simplified UCI signaling. Specifically "0" may indicate that the UCI is a complete UCI, and thus the HARQ process ID field includes a bitmap indicating HARQ process IDs for all PUSCHs associated with the UCI signaling in sequence. "1" may indicate that the UCI is a simplified UCI, and thus the HARQ process ID field may be configured based on one of the following options: one HARQ process ID for the first PUSCH transmission of all PUSCH transmissions associated with the UCI signaling, one HARQ process ID for the last PUSCH transmission of all PUSCH transmissions associated with the UCI signaling, and one shared HARQ process ID for all PUSCH transmissions associated with the UCI signaling. In this case, selecting which option from the three options may be predefined for the BS 102 and UE 101.

In yet another embodiment of the present disclosure, the control information may not indicate the option based on which the HARQ process ID field is configured. In this case, the UE 101 may determine the option based on which the HARQ process ID field is configured and transmit an indicator indicating the option to the BS 102. For example, the UE 101 may transmit 2-bit information as illustrated above to indicate the option based on which the HARQ process ID field is configured. After receiving the indicator indicating the option, the BS 102 may know the option based on which the HARQ process ID field is configured.

In yet another embodiment of the present disclosure, the control information may not indicate the option based on which the HARQ process ID field is configured. In this case, the UE 101 may determine the type of the UCI signaling being a complete UCI signaling or a simplified UCI signaling and then transmit an indictor indicating the type of the UCI signaling, wherein the type of the UCI signaling may indicate the option based on which the HARQ process ID field is configured. For example, the indicator may be 1-bit information as illustrated above. After receiving the indicator indicating the type of the UCI signaling, the BS 102 may know the option based on which the HARQ process ID field is configured.

In the case that the control information or the indictor received from UE 101 indicates that the HARQ process ID field may include a bitmap indicating HARQ process IDs for all of all PUSCH transmissions associated with the UCI signaling in sequence, after receiving the UCI signaling, the BS 102 may know the HARQ process IDs for all PUSCH transmissions associated with the UCI signaling are in sequence in the bitmap. For example, assuming that the set of HARQ process IDs indicated by the control information may be {2, 4, 6, 7, 8} and the UCI signaling is associated with four consecutive PUSCH transmissions, e.g., PUSCH 0, PUSCH 1, and PUSCH 2 in the initial slot and PUSCH 3 in the non-initial slot subsequent to the initial slot, the bitmap included in the HARQ process ID field may include HARQ process IDs "2", "4", "7", and "8" in sequence. After receiving the UCI signaling, the BS 102 may determine that the HARQ process IDs for PUSCH 0, PUSCH 1, PUSCH 2, PUSCH 3 are "2", "4", "7", and "8", respectively.

In the case that the control information or the indictor received from UE 101 indicates that the HARQ process ID field may include one HARQ process ID for a first PUSCH transmission of all PUSCH transmissions associated with the UCI signaling, after receiving the UCI signaling, the BS 102 may know that the HARQ process ID for the first PUSCH transmission, and then then the BS 102 may determine HARQ process IDs for the remaining PUSCHs from the set of HARQ process IDs in ascending sequence based on the HARQ process ID for the first PUSCH transmission. For example, still assuming that the set of HARQ process IDs indicated by the control information may be {2, 4, 6, 7, 8} and the UCI signaling is associated with four consecutive PUSCH transmissions, e.g., PUSCH 0, PUSCH 1, and PUSCH 2 in the initial slot and PUSCH 3 in the non-initial slot subsequent to the initial slot, the HARQ process ID field may include a HARQ process ID "2." After receiving the UCI signaling, the BS 102 may determine that the HARQ process ID for PUSCH 0 is "2," and then the BS 102 may determine HARQ process IDs for PUSCH 1, PUSCH 2, PUSCH 3 are "4", "6", and "7", respectively.

In the case that the control information or the indictor received from UE 101 indicates that the HARQ process ID field may include one HARQ process ID for a last PUSCH transmission of all PUSCH transmissions associated with the UCI signaling, after receiving the UCI signaling, the BS 102 may know that the HARQ process ID for the first PUSCH transmission, and then then the BS 102 may determine HARQ process IDs for the remaining PUSCH transmissions from the set of HARQ process IDs in descending sequence based on the HARQ process ID for the first PUSCH transmission. For example, still assuming that the set of HARQ process IDs indicated by the control information may be {2, 4, 6, 7, 8} and the UCI signaling is associated with four consecutive PUSCH transmissions, e.g., PUSCH 0, PUSCH 1, and PUSCH 2 in the initial slot and PUSCH 3 in the non-initial slot subsequent to the initial slot, the HARQ process ID field may include a HARQ process ID "7." After receiving the UCI signaling, the BS 102 may determine that the HARQ process ID for PUSCH 3 is "7," and then the BS 102 may determine HARQ process IDs for PUSCH 2, PUSCH 1, PUSCH 0 are "6", "4", and "2", respectively.

In the case that the control information or the indictor received from UE 101 indicates that the HARQ process ID field may include one shared HARQ process ID for all PUSCH transmissions associated with the UCI signaling. After receiving the UCI signaling, the BS 102 may know that the HARQ process ID included in the HARQ process ID field is for all of the PUSCH transmissions. For example, still assuming that the set of HARQ process IDs indicated by the control information may be {2, 4, 6, 7, 8} and the UCI signaling is associated with four consecutive PUSCH transmissions, e.g., PUSCH 0, PUSCH 1, and PUSCH 2 in the initial slot and PUSCH 3 in the non-initial slot subsequent to the initial slot, and the HARQ process ID field may include a HARQ process ID "7." After receiving the UCI signaling, the BS 102 may determine that the HARQ process ID for all of PUSCH 0, PUSCH 1, PUSCH 2, and PUSCH 3 is "7."

According to some embodiments of the present disclosure, the NDI field may be configured based on one of the following options: a bitmap indicating NDIs for all PUSCH transmissions associated with the UCI signaling in sequence, and one shared NDI for all PUSCH transmissions associated with the UCI signaling.

In an embodiment of the present disclosure, the control information may indicate the option based on which the NDI field is configured. For example, the control information may include 1-bit information to indicate the option based on which the NDI field is configured. "0" may indicate that the NDI field is configured based on a bitmap indicating NDIs for all PUSCH transmissions associated with the UCI signaling in sequence, and then the NDI field may include a bitmap indicating NDIs for all PUSCH transmissions associated with the UCI signaling in sequence. "1" may indicate that the NDI field is configured based on one shared NDI for all PUSCH transmissions associated with the UCI signaling, and then the NDI field may include one shared NDI for all PUSCH transmissions associated with the UCI signaling.

In another embodiment of the present disclosure, the control information may not indicate the option based on which the NDI field is configured, whereas the UE 101 itself may determine the option and indicate the option to the BS 102. For example, the UE 101 may transmit 1-bit information as illustrated above to indicate the option based on which the NDI field is configured.

In yet another embodiment of the present disclosure, the indictor indicating a type of the UCI signaling included in the control information or transmitted by the UE may also indicate the option based on which the NDI field is configured. For example, the indicator may be 1-bit information. "0" may indicate that the UCI is a complete UCI, and thus the NDI field includes a bitmap indicating NDIs for all PUSCH transmissions associated with the UCI signaling in sequence. "1" may indicate that the UCI is a simplified UCI, and thus the NDI field may include one shared NDI for all PUSCH transmissions associated with the UCI signaling.

Accordingly, in the case that the control information or the indictor received from UE 101 indicates that the NDI field may include a bitmap indicating NDIs for all PUSCH transmissions associated with the UCI signaling in sequence, after receiving the UCI signaling, the BS 102 may know that the NDIs for all PUSCH transmissions associated with the UCI signaling are in sequence in the bitmap. In the case that the control information or the indictor received from UE 101 indicates that the NDI field may include one shared NDI for all PUSCH transmissions associated with the UCI signaling, after receiving the UCI signaling, the BS 102 may determine that one NDI is applied for all PUSCH transmissions associated with the UCI signaling.

According to some embodiments of the present disclosure, the RV field may be configured based on one of the following options: a bitmap indicating RVs for all PUSCH transmissions associated with the UCI signaling in sequence, and one shared RV for all PUSCH transmissions associated with the UCI signaling.

In an embodiment of the present disclosure, the control information may indicate the option based on which the RV field is configured. For example, the control information may include 1-bit information to indicate the option based on which the RV field is configured. "0" may indicate that the RV field is configured based on a bitmap indicating RVs for all PUSCH transmissions associated with the UCI signaling in sequence, and then the RV field may include a bitmap indicating RVs for all PUSCH transmissions associated with the UCI signaling in sequence. "1" may indicate that the RV field is configured based on one shared RV for all PUSCH transmissions associated with the UCI signaling, and then the RV field may include one shared RV for all PUSCH transmissions associated with the UCI signaling.

In another embodiment of the present disclosure, the control information may not indicate the option based on which the RV field is configured, whereas the UE 101 itself may determine the option and indicate the option to the BS 102. For example, the UE 101 may transmit 1-bit information as illustrated above to indicate the option based on which the RV field is configured.

In yet another embodiment of the present disclosure, the indictor indicating a type of the UCI signaling included in the control information or transmitted by the UE 101 may also indicate the option based on which the RV field is configured. For example, the indicator may be 1-bit information. "0" may indicate that the UCI is a complete UCI, and thus the RV field includes a bitmap indicating RVs for all PUSCH transmissions associated with the UCI signaling in sequence. "1" may indicate that the UCI is a simplified UCI, and thus the RV field may include one shared RV for all PUSCH transmissions associated with the UCI signaling.

Accordingly, in the case that the control information or the indictor received from UE 101 indicates that the RV field may include a bitmap indicating RVs for all PUSCH transmissions associated with the UCI signaling in sequence, after receiving the UCI signaling, the BS 102 may know that the RVs for all PUSCH transmissions associated with the UCI signaling are in sequence in the bitmap. In the case that the control information or the indictor received from UE 101 indicates that the RV field may include one shared RV for all PUSCH transmissions associated with the UCI signaling, after receiving the UCI signaling, the BS 102 may determine that one RV is applied for all PUSCH transmissions associated with the UCI signaling.

According to some embodiments of the present disclosure, the UE ID field may include one UE ID for all PUSCH transmissions associated with the UCI signaling.

According to some embodiments of the present disclosure, the starting and ending position field may include a starting position field indicating a starting position of a first PUSCH transmission of all PUSCH transmissions associated with the UCI signaling and an ending position field indicating an ending position of a last PUSCH transmission of all PUSCH transmissions associated with the UCI signaling.

According to some embodiments of the present disclosure, the transmission parameter field may be configured based on one of the following options: a bitmap indicating transmission parameters for all PUSCH transmissions associated with the UCI signaling in sequence; and one shared transmission parameter for all PUSCH transmissions associated with the UCI signaling. The transmission parameter may include at least one of the followings: modulation and coding scheme (MCS), precoding matrix indicators (PMI), rank indication (RI), sounding reference signal resource indicator (SRI), etc.

In an embodiment of the present disclosure, the control information may indicate the option based on which the transmission parameter field is configured. For example, the control information may include 1-bit information to indicate the option based on which the transmission parameter field is configured. "0" may indicate that the transmission parameter field is configured based on a bitmap indicating transmission parameters for all PUSCH transmissions associated with the UCI signaling in sequence, and then the transmission parameter field may include a bitmap indicating transmission parameters for all PUSCH transmissions associated with the UCI signaling in sequence. "1" may indicate that the transmission parameter field is configured based on one shared transmission parameter for all PUSCH transmissions associated with the UCI signaling, and then the transmission parameter field may include one shared transmission parameter for all PUSCH transmissions associated with the UCI signaling.

In another embodiment of the present disclosure, the control information may not indicate the option based on which the transmission parameter field is configured, whereas the UE 101 itself may determine the option and indicate the option to the BS 102. For example, the UE 101 may transmit 1-bit information as illustrated above to indicate the option based on which the transmission parameter field is configured.

In yet another embodiment of the present disclosure, the indictor indicating a type of the UCI signaling included in the control information or transmitted by the UE 101 may also indicate the option based on which the transmission parameter field is configured. For example, the indicator may be 1-bit information. "0" may indicate that the UCI is a complete UCI, and thus the transmission parameter field includes a bitmap indicating transmission parameters for all PUSCH transmissions associated with the UCI signaling in sequence. "1" may indicate that the UCI is a simplified UCI, and thus the transmission parameter field may include one shared transmission parameter for all PUSCH transmissions associated with the UCI signaling.

Accordingly, in the case that the control information or the indictor received from UE 101 indicates that the transmission parameter field may include a bitmap indicating transmission parameters for all PUSCH transmissions associated with the UCI signaling in sequence, after receiving the UCI signaling, the BS 102 may know that the transmission parameters for all PUSCH transmissions associated with the UCI signaling are in sequence in the bitmap. In the case that the control information or the indictor received from UE 101 indicates that the NDI field may include one shared transmission parameter for all PUSCH transmissions associated with the UCI signaling, after receiving the UCI signaling, the BS 102 may determine that one transmission parameter is applied for all PUSCH transmissions associated with the UCI signaling.

According to some embodiments of the present disclosure, the CBGTI field may include a bitmap indicating CBGTI for all PUSCH transmissions associated with the UCI signaling.

Figure 8:
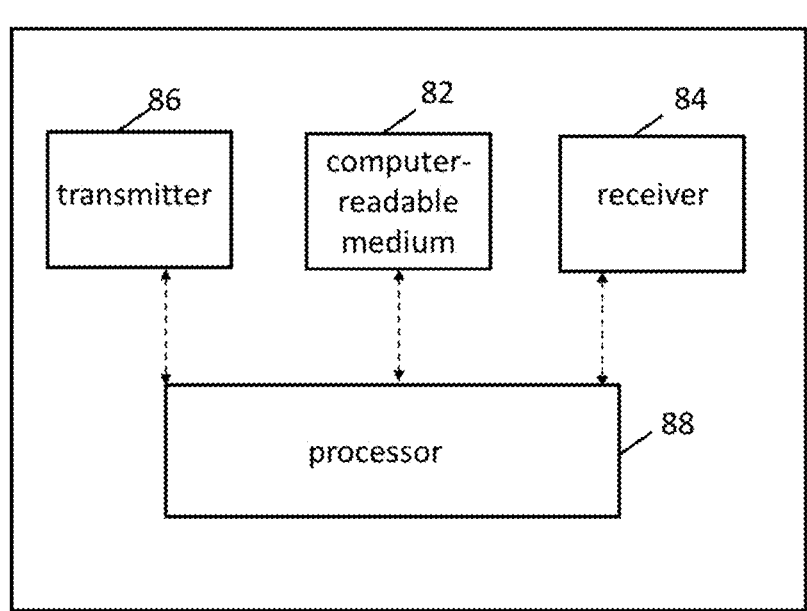
FIG. 8 illustrates a block diagram of an apparatus for overhead reduction for CG based uplink transmission according to an embodiment of the present disclosure.

FIG. 8 illustrates a block diagram of an apparatus for overhead reduction for CG based uplink transmission according to an embodiment of the present disclosure. In an embodiment of the present disclosure, the apparatus 800 may be a UE 101 as illustrated in FIG. 1.

Referring to FIG. 8, the apparatus 800 may include at least one non-transitory computer-readable medium 82, at least one receiver 84, at least one transmitter 86, and at least one processor 88. In some embodiment of the present disclosure, at least one receiver 84 and at least one transmitter 86 and be integrated into at least one transceiver. The at least one non-transitory computer-readable medium 82 may have computer executable instructions stored therein. The at least one processor 88 may be coupled to the at least one non-transitory computer-readable medium 82, the at least one receiver 84 and the at least one transmitter 86. The computer executable instructions can be programmed to implement a method with the at least one receiver 64, the at least one transmitter 86 and the at least one processor 88.

The method can be a method according to an embodiment of the present disclosure, for example, the method shown in FIG. 6.

Figure 9:
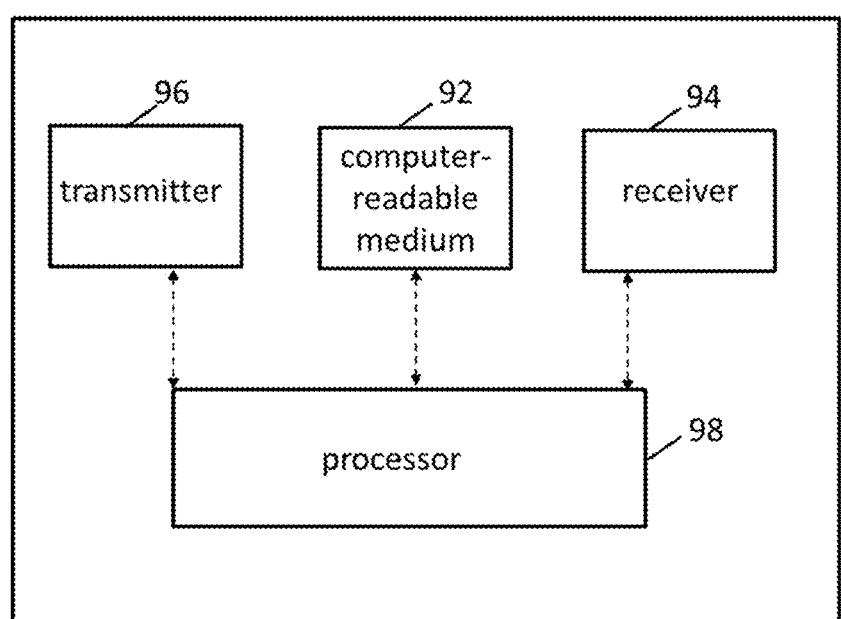
FIG. 9 illustrates a block diagram of an apparatus for overhead reduction for CG based uplink transmission according to another embodiment of the present disclosure.

FIG. 9 illustrates a block diagram of an apparatus for overhead reduction for CG based uplink transmission according to another embodiment of the present disclosure. In an embodiment of the present disclosure, the apparatus 900 may be a BS 102 as illustrated in FIG. 1.

Referring to FIG. 9, the apparatus 900 may include at least one non-transitory computer-readable medium 92, at least one receiver 94, at least one transmitter 96, and at least one processor 98. In some embodiment of the present disclosure, at least one receiver 94 and at least one transmitter 86 and be integrated into at least one transceiver. The at least one non-transitory computer-readable medium 92 may have computer executable instructions stored therein. The at least one processor 98 may be coupled to the at least one non-transitory computer-readable medium 92, the at least one receiver 94 and the at least one transmitter 96. The computer executable instructions can be programmed to implement a method with the at least one receiver 92, the at least one transmitter 94 and the at least one processor 96. The method can be a method according to an embodiment of the present application, for example, the method shown in FIG. 7.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A user equipment (UE) for wireless communication, comprising:

at least one memory; and at least one processor coupled with the at least one memory and configured to cause the UE to:

receive control information that schedules a plurality of physical uplink shared channel transmissions in a single slot, wherein the control information indicates a position of shared uplink control information signaling in a single physical uplink shared channel transmission of the plurality of physical uplink shared channel transmissions in the single slot; and transmit the plurality of physical uplink shared channel transmissions in the single slot based at least in part on the control information, wherein the single physical uplink shared channel transmission of the plurality of physical uplink shared channel transmissions at the position comprises the shared uplink control information signaling, and wherein a hybrid automatic repeat request process identity field of the shared uplink control information signaling is shared across the plurality of physical uplink shared channel transmissions in the single slot.

2. The UE of claim 1, wherein the shared uplink control information signaling comprises one or more of:

a bitmap indicating a sequence of hybrid automatic repeat request process identities for the plurality of physical uplink shared channel transmissions;

a hybrid automatic repeat request process identity for a first physical uplink shared channel transmission of the plurality of physical uplink shared channel transmissions;

a hybrid automatic repeat request process identity for a last physical uplink shared channel transmission of the plurality of physical uplink shared channel transmissions; or a shared hybrid automatic repeat request process identity for the plurality of physical uplink shared channel transmissions.

3. The UE of claim 1, wherein the control information indicates the position of the shared uplink control information signaling is within a last physical uplink shared channel transmission of the plurality of physical uplink shared channel transmissions.

4. The UE of claim 1, wherein the shared uplink control information signaling is associated with the plurality of physical uplink shared channel transmissions in the single slot and an additional plurality of physical uplink shared channel transmissions in one or more consecutive slots subsequent to the single slot.

5. The UE of claim 1, wherein the shared uplink control information signaling comprises at least one of:

a new data indicator field:

a redundancy version field;

a UE identity field;

a starting and ending position field;

a transmission parameter field; and a code block group transmission information field.

6. The UE of claim 2, wherein the control information indicates the one or more of the bitmap, the hybrid automatic repeat request process identity for the first physical uplink shared channel transmission, or the hybrid automatic repeat request process identity for the last physical uplink shared channel transmission based at least in part on the hybrid automatic repeat request process identity field.

7. The UE of claim 2, wherein the at least one processor is further configured to cause the UE to:

determine a type of the shared uplink control information signaling is a complete uplink control information signaling type or a simplified uplink control information signaling type, wherein the type of the shared uplink control information signaling indicates the one or more of the bitmap, the hybrid automatic repeat request process identity for the first physical uplink shared channel transmission, or the hybrid automatic repeat request process identity for the last physical uplink shared channel transmission based at least in part on the hybrid automatic repeat request process identity field; and transmit an indicator indicating the type of the shared uplink control information signaling.

8. The UE of claim 5, wherein the new data indicator field is configured based at least in part on one or more of a bitmap indicating a sequence of new data indicators for the plurality of physical uplink shared channel transmissions or a shared new data indicator for the plurality of physical uplink shared channel transmissions.

9. The UE of claim 5, wherein the redundancy version field is configured based at least in part on one or more of a bitmap indicating a sequence of redundancy versions for the plurality of physical uplink shared channel transmissions or a shared redundancy version for the plurality of physical uplink shared channel transmissions.

10. The UE of claim 5, wherein the UE identity field comprises a single UE identity for the plurality of physical uplink shared channel transmissions.

11. The UE of claim 5, wherein the starting and ending position field comprises a starting position field indicating a starting position of a first physical uplink shared channel transmission of the plurality of physical uplink shared channel transmissions and an ending position field indicating an ending position of a last physical uplink shared channel transmission of the plurality of physical uplink shared channel transmissions.

12. The UE of claim 5, wherein the code block group transmission information field comprises a bitmap indicating code block group transmission information for the plurality of physical uplink shared channel transmissions.

13. A base station (BS) for wireless communication, comprising:

at least one memory; and at least one processor coupled with the at least one memory and configured to cause the BS to:

transmit control information that schedules a plurality of physical uplink shared channel transmissions in a single slot, wherein the control information indicates a position of shared uplink control information signaling in a single physical uplink shared channel transmission of the plurality of physical uplink shared channel transmissions in the single slot; and receive the plurality of physical uplink shared channel transmissions in the single slot based at least in part on the control information, wherein the single physical uplink shared channel transmission of the plurality of physical uplink shared channel transmissions at the position comprises the shared uplink control information signaling, and wherein a hybrid automatic repeat request process identity field of the shared uplink control information signaling is shared across the plurality of physical uplink shared channel transmissions in the single slot.

14. The BS of claim 13, wherein the shared uplink control information signaling is associated with the plurality of physical uplink shared channel transmissions in the single slot and an additional plurality of physical uplink shared channel transmissions in one or more consecutive slots subsequent to the single slot.

15. The BS of claim 13, wherein the control information indicates a set of hybrid automatic repeat request process identities that can be used for the plurality of physical uplink shared channel transmissions and indicates that the hybrid automatic repeat request process identity field comprises one or more of:

a bitmap indicating a sequence of hybrid automatic repeat request process identities for the plurality of physical uplink shared channel transmissions;

a hybrid automatic repeat request process identity for a first physical uplink shared channel transmission of the plurality of physical uplink shared channel transmissions;

a hybrid automatic repeat request process identity for a last physical uplink shared channel transmission of the plurality of physical uplink shared channel transmissions; or a shared hybrid automatic repeat request process identity for the plurality of physical uplink shared channel transmissions.

16. The BS of claim 15, wherein the at least one processor is further configured to cause the BS to, based at least in part on the hybrid automatic repeat request process identity field comprising a single hybrid automatic repeat request process identity for the first physical uplink shared channel transmission of the plurality of physical uplink shared channel transmissions, determine hybrid automatic repeat request process identities for one or more remaining physical uplink shared channel transmissions of the plurality of physical uplink shared channel transmissions from the set of hybrid automatic repeat request process identities in ascending sequence based at least in part on the hybrid automatic repeat request process identity for the first physical uplink shared channel transmission.

17. The BS of claim 15, wherein the at least one processor is further configured to cause the BS to, based at least in part on the hybrid automatic repeat request process identity field comprising a single hybrid automatic repeat request process identity for the last physical uplink shared channel transmission of the plurality of physical uplink shared channel transmissions, determine hybrid automatic repeat request process identities for one or more remaining physical uplink shared channel transmissions of the plurality of physical uplink shared channel transmissions from the set of hybrid automatic repeat request process identities in descending sequence based at least in part on the hybrid automatic repeat request process identity for the last physical uplink shared channel transmission.

18. A method performed by a user equipment (UE), the method comprising:

receiving control information that schedules a plurality of physical uplink shared channel transmissions in a single slot, wherein the control information indicates a position of shared uplink control information signaling in a single physical uplink shared channel transmission of the plurality of physical uplink shared channel transmissions in the single slot; and transmitting the plurality of physical uplink shared channel transmissions in the single slot based at least in part on the control information, wherein the single physical uplink shared channel transmission of the plurality of physical uplink shared channel transmissions at the position comprises the shared uplink control information signaling, and wherein a hybrid automatic repeat request process identity field of the shared uplink control information signaling is shared across the plurality of physical uplink shared channel transmissions in the single slot.

19. The UE of claim 1, wherein respective physical uplink shared channel transmissions of the plurality of physical uplink shared channel transmissions are consecutive in the single slot, and wherein one or more time gaps between the respective physical uplink shared channel transmissions of the plurality of physical uplink shared channel transmissions satisfy a threshold value comprising a numerical quantity of symbols in the single slot.

20. A method performed by a base station (BS), the method comprising:

transmitting control information that schedules a plurality of physical uplink shared channel transmissions in a single slot, wherein the control information indicates a position of shared uplink control information signaling in a single physical uplink shared channel transmission of the plurality of physical uplink shared channel transmissions in the single slot; and receiving the plurality of physical uplink shared channel transmissions in the single slot based at least in part on the control information, wherein the single physical uplink shared channel transmission of the plurality of physical uplink shared channel transmissions at the position comprises the shared uplink control information signaling, and wherein a hybrid automatic repeat request process identity field of the shared uplink control information signaling is shared across the plurality of physical uplink shared channel transmissions in the single slot.

* * * * *